(12) United States Patent
Matsuno et al.

(10) Patent No.: US 7,340,884 B2
(45) Date of Patent: Mar. 11, 2008

(54) EXHAUST PURIFYING APPARATUS AND EXHAUST PURIFYING METHOD FOR INTERNAL COMBUSTION ENGINE

(75) Inventors: Shigehiro Matsuno, Toyota (JP); Tatsuhisa Yokoi, Toyota (JP); Yasuhiko Otsubo, Toyota (JP); Hiroki Matsuoka, Susono (JP); Takayoshi Inaba, Kariya (JP)

(73) Assignees: Toyota Jidosha Kabushiki Kaisha, Toyota-shi (JP); DENSO CORPORATION, Kariya-shi (JP)

( * ) Notice: Subject to any disclaimer, the term of this patent is extended or adjusted under 35 U.S.C. 154(b) by 16 days.

(21) Appl. No.: 10/554,992

(22) PCT Filed: Mar. 10, 2005

(86) PCT No.: PCT/JP2005/005037

§ 371 (c)(1),
(2), (4) Date: Nov. 1, 2005

(87) PCT Pub. No.: WO2005/088090

PCT Pub. Date: Sep. 22, 2005

(65) Prior Publication Data

US 2006/0236683 A1    Oct. 26, 2006

(30) Foreign Application Priority Data

Mar. 11, 2004   (JP)   ............... 2004-068990

(51) Int. Cl.
*F01N 3/00* (2006.01)
(52) U.S. Cl. ............... 60/295; 60/274; 60/285; 60/297; 60/311
(58) Field of Classification Search .............. 60/274, 60/278, 280, 285, 286, 295, 297, 311
See application file for complete search history.

(56) References Cited

U.S. PATENT DOCUMENTS

| | | | |
|---|---|---|---|
| 6,666,020 B2 * | 12/2003 | Tonetti et al. ............... 60/286 |
| 6,851,258 B2 * | 2/2005 | Kawashima et al. .......... 60/311 |
| 6,959,541 B2 * | 11/2005 | Kosaka et al. ............... 60/295 |
| 7,013,638 B2 * | 3/2006 | Hiranuma et al. ............ 60/286 |
| 7,043,903 B2 * | 5/2006 | Onodera et al. .............. 60/295 |
| 7,054,734 B2 * | 5/2006 | Todoroki et al. ........... 701/105 |
| 7,076,944 B2 * | 7/2006 | Okugawa et al. ............. 60/295 |

FOREIGN PATENT DOCUMENTS

| | | |
|---|---|---|
| JP | 2002-227688 | 8/2002 |
| JP | 2002-332822 | 11/2002 |
| JP | 2003-020930 | 1/2003 |
| WO | WO 00/28196 | 5/2000 |

\* cited by examiner

*Primary Examiner*—Binh Q. Tran
(74) *Attorney, Agent, or Firm*—Kenyon & Kenyon LLP

(57) ABSTRACT

An exhaust purifying apparatus for an internal combustion engine includes execution means, wherein, when an accumulation amount of particulate matter about a catalyst becomes less than a first determination value after a PM elimination control is started, the execution means executes burn-up control. Stopping means stops the PM elimination control based on an end of the burn-up control. Forcibly ending means forcibly ends the burn-up control when time elapsed since the accumulation amount of particulate matter about the catalyst has dropped to a second determination value reaches a predetermined time. Therefore, the exhaust purifying apparatus is capable of completely burning particulate matter in a PM filter, and suppresses degradation of fuel economy.

6 Claims, 4 Drawing Sheets

Fig. 1

Fig. 4(a)
PM Accumulation Amount

Fig. 4(b)
PM Elimination Control

Fig. 4(c)
Burn-up Control

Fig. 4(d)
Counter C

EXHAUST PURIFYING APPARATUS AND EXHAUST PURIFYING METHOD FOR INTERNAL COMBUSTION ENGINE

This is a 371 national phase application of PCT/JP2005/005037 filed 10 Mar. 2005, claiming priority to Japanese Patent Application No. 2004-068990 filed 11 Mar. 2004, the contents of which are incorporated herein by reference.

FIELD OF THE INVENTION

The present invention relates to an exhaust purifying apparatus and an exhaust purifying method for an internal combustion engine.

BACKGROUND OF THE INVENTION

A typical exhaust purifying apparatus applied to an internal combustion engine such as a vehicle diesel engine includes a PM filter (refer to Japanese Laid-Open Patent Publication No. 2002-227688) that is located in an exhaust system. The PM filter traps particulate matter ("PM"), which is predominantly composed of soot in exhaust gas. In an internal combustion engine provided with such an exhaust purifying apparatus, PM elimination control is performed to prevent the PM filter from being clogged with particulate matter. In the PM elimination control, particulate matter is burned and removed.

In the PM elimination control disclosed in Japanese Laid-Open Patent Publication No. 2002-227688, the exhaust air-fuel ratio is reversed between a rich state and a lean state to supply an unburned fuel component and oxygen to a catalyst of the PM filter. Oxidation of the unburned fuel component is used to increase the catalyst bed temperature and to burn particulate matter in the PM filter. The supply of unburned fuel component to the catalyst in the PM elimination control is performed in a manner that enables a temperature increase in the catalyst with a minimized amount of unburned fuel. This is to minimize extra fuel consumption due to the PM elimination control.

However, it has been confirmed that, in the above PM elimination control, not all particulate matter deposited at the front end of the PM filter (upstream end relative to the flow direction of exhaust gas) can be burned. The reasons for this are considered to be as follows.

The front end of a PM filter is susceptible to deposition of particulate matter, and the amount of deposited particulate matter is more than that in the downstream section.

The PM elimination control, in which unburned fuel component and oxygen are supplied to the PM filter, cannot supply a sufficient amount per unit time of unburned fuel component and oxygen to burn all the particulate matter deposited at the front end of the PM filter.

Accordingly, it is inferred that, even if the PM elimination control is performed for an extended time, unburned PM remains at the front end of the PM filter. If the exhaust air-fuel ratio is richened after the PM elimination control is ended with some remaining PM, unburned fuel component is supplied to the PM filter, and oxidation of the unburned fuel causes the particulate matter to burn, which can excessively increase the catalyst bed temperature of the PM filter.

SUMMARY OF THE INVENTION

Accordingly, it is an objective of the present invention to provide an exhaust purifying apparatus for an internal combustion engine that is capable of completely burning particulate matter in a PM filter, and suppresses degradation of fuel economy that is likely to be caused by burning the particulate matter. The present invention further provides an exhaust purifying method for an internal combustion engine.

To achieve the foregoing and other objectives and in accordance with the purpose of the present invention, the invention provides an exhaust purifying apparatus for an internal combustion engine. The apparatus performs PM elimination control in which an unburned fuel component is supplied to a catalyst located in an exhaust system of the internal combustion engine so that the temperature of the catalyst is increased and particulate matter trapped at the catalyst is burned. The apparatus includes execution means, wherein, when an accumulation amount of particulate matter at the catalyst becomes less than a first determination value after the PM elimination control is started, the execution means executes burn-up control in which performance and stopping of concentrated intermittent fuel addition to a section of the exhaust system that is upstream of the catalyst are repeated a predetermined number of times. Stopping means stops the PM elimination control based on an end of the burn-up control. Forcibly ending means forcibly ends the burn-up control when, after the burn-up control is started, time elapsed since the accumulation amount of particulate matter at the catalyst has dropped to a second determination value reaches a predetermined time. The second determination value is less than the first determination value.

Further, the present invention provides an exhaust purifying method for an internal combustion engine. The method includes performing PM elimination control in which an unburned fuel component is supplied to a catalyst located in an exhaust system of the internal combustion engine so that the temperature of the catalyst is increased and particulate matter trapped at the catalyst is burned. Burn-up control is executed when an accumulation amount of particulate matter at the catalyst becomes less than a first determination value after the PM elimination control is started. In the burn-up control, performance and stopping of concentrated intermittent fuel addition to a section of the exhaust system that is upstream of the catalyst are repeated a predetermined number of times. The PM elimination control is Stopped on the condition that the burn-up control is ended. The burn-up control is forcibly ended when, after the burn-up control is started, time elapsed since the accumulation amount of particulate matter at the catalyst has been reduced to a second determination value reaches a predetermined time. The second determination value is less than the first determination value.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An exhaust purifying apparatus for an internal combustion engine according to a preferred embodiment of the present invention will now be described with reference to FIGS. 1 to 4(d).

Figure 1:
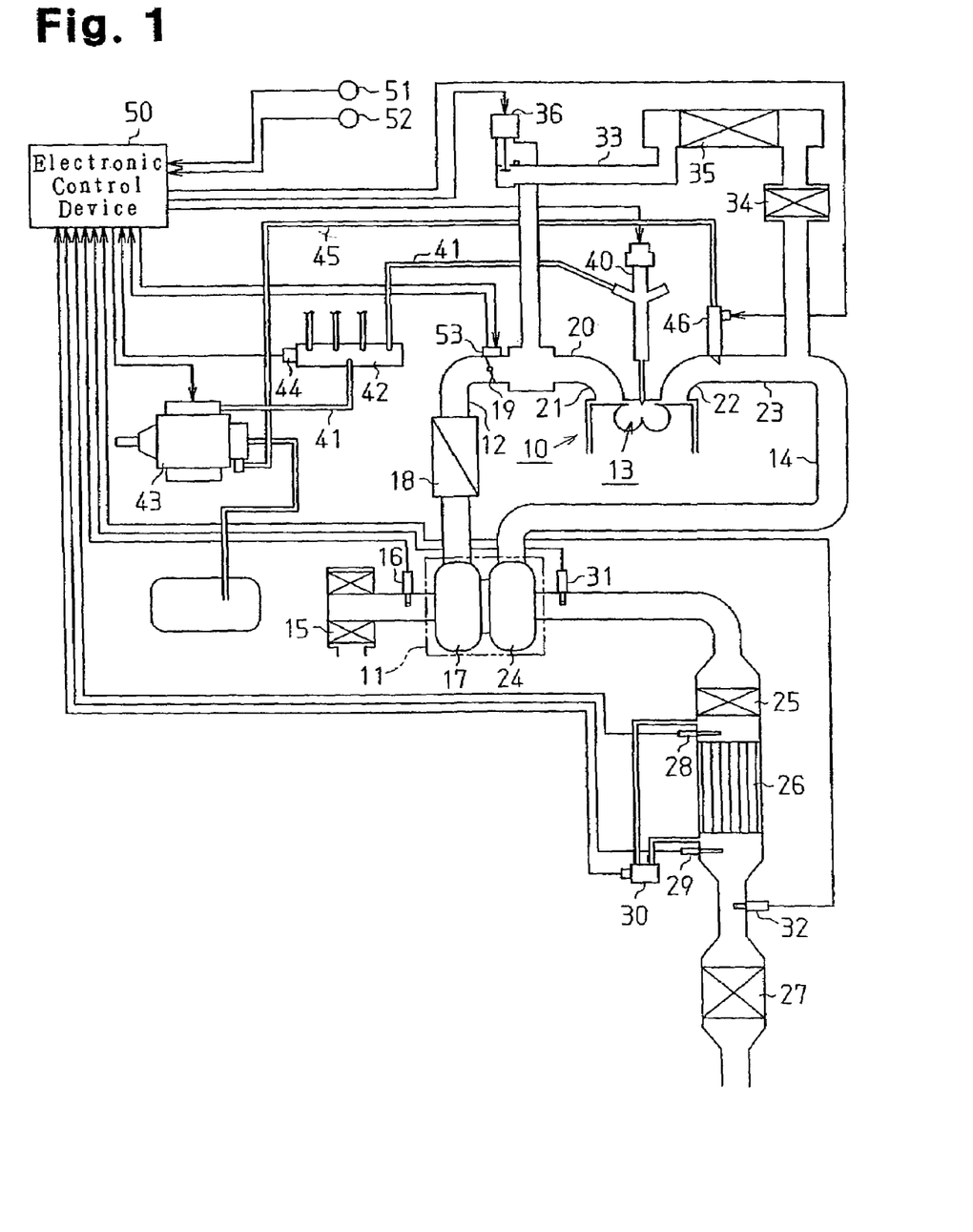
FIG. 1 is a diagrammatic view illustrating the overall configuration of an internal combustion engine to which an exhaust purifying apparatus according to the present invention is applied.

FIG. 1 illustrates the configuration of an internal combustion engine 10 to which an exhaust purifying apparatus according to this embodiment is applied. The internal combustion engine 10 is a diesel engine that includes a common rail fuel injection device, and a turbocharger 11. The engine 10 includes an intake passage 12, combustion chambers 13, and an exhaust passage 14.

The intake passage 12 forms an intake system for the internal combustion engine 10. In the most upstream section of the intake passage 12, an air cleaner 15 is located. From the air cleaner 15 toward the downstream side, the air flow meter 16, a compressor 17 incorporated in the turbocharger 11, an intercooler 18, and an intake throttle valve 19 are provided in the intake passage 12. The intake passage 12 is branched at an intake manifold 20 located downstream of the intake throttle valve 19, and connected to each of the combustion chambers 13 of the internal combustion engine 10 through intake ports 21.

In the exhaust passage 14, which forms part of the exhaust system for the internal combustion engine 10, an exhaust port 22 is connected to each combustion chamber 13. The exhaust ports 22 are connected to an exhaust turbine 24 of the turbocharger 11 through an exhaust manifold 23. In a section of the exhaust passage 14 that is downstream of the exhaust turbine 24, a NOx catalytic converter 25, a PM filter 26, and an oxidation catalytic converter 27 are provided in this order from the upstream side.

The NOx catalytic converter 25 supports an occlusion-reduction NOx catalyst. The NOx catalyst occludes NOx in exhaust gas when the concentration of oxygen in exhaust gas is high, and emits the occluded NOx when the concentration of oxygen in the exhaust gas is low. If a sufficient amount of unburned fuel component, which functions as a reducing agent, exists in the vicinity thereof, the NOx catalyst reduces emitted NOx to purify the exhaust gas.

The PM filter 26 is made of a porous material and traps particulate matter (PM), which is predominantly composed of soot, in exhaust. Like the NOx catalytic converter 25, the PM filter 26 supports an occlusion-reduction NOx catalyst. The NOx catalyst of the PM filter 26 reduces emitted NOx to purify the exhaust gas. The reaction triggered by the NOx catalyst burns (oxidizes) and removes the trapped PM.

The oxidation catalytic converter 27 supports an oxidation catalyst. The oxidation catalyst oxidizes hydrocarbon (HC) and carbon monoxide (CO) in exhaust gas to purify the exhaust gas.

In sections upstream of and downstream of the PM filter 26, an input gas temperature sensor 28 and an output gas temperature sensor 29 are provided, respectively. The input gas temperature sensor 28 detects an input gas temperature, which is the temperature of exhaust gas that flows into the PM filter 26. The output gas temperature sensor 29 detects an output gas temperature, which is the temperature of exhaust gas that has passed through the PM filter 26. Also, a differential pressure sensor 30 is provided in the exhaust passage 14. The differential pressure sensor 30 detects a pressure difference between a section upstream and a section downstream of the PM filter 26. Oxygen sensors 31, 32 are located in a section of the exhaust passage 14 that is upstream of the NOx catalytic converter 25 and a section of the exhaust passage 14 between the PM filter 26 and the oxidation catalytic converter 27, respectively. The oxygen sensors 31, 32 detect the concentration of oxygen in exhaust gas.

The internal combustion engine 10 further includes an exhaust gas recirculation device (EGR device) for returning some of the exhaust gas to the air in the intake passage 12. The EGR device includes an EGR passage 33 that connects the exhaust passage 14 with the intake passage 12. The most upstream section of the EGR passage 33 is connected to a section of the exhaust passage 14 that is upstream of the exhaust turbine 24.

In the EGR passage 33, an EGR catalyst 34, an EGR cooler 35, and an EGR valve 36 are provided in this order from the upstream side. The EGR catalyst 34 reforms recirculated exhaust gas. The EGR cooler 35 cools the reformed exhaust gas. The EGR valve 36 adjusts the flow rate of the reformed and cooled exhaust gas. The most downstream section of the EGR passage 33 is connected to a section of the intake passage 12 that is downstream of the intake throttle valve 19.

An injector 40 is provided in each combustion chamber 13 of the internal combustion engine 10 to inject fuel to be combusted in the combustion chamber 13. The injectors 40 are connected to a common rail 42 with a high-pressure fuel pipe 41. High-pressure fuel is supplied to the common rail 42 through a fuel pump 43. The pressure of high-pressure fuel in the common rail 42 is detected by a rail pressure sensor 44 attached to the common rail 42. The fuel pump 43 is capable of supplying low-pressure fuel to a fuel adding valve 46 through a low-pressure fuel pipe 45.

Various control procedures for the internal combustion engine 10 are executed by an electronic control device 50. The electronic control device 50 includes a CPU that executes various computation processes related to control of the engine 10, a ROM storing programs and data necessary for the control, a RAM for temporarily storing the computation results of the CPU, and input and output ports for inputting and outputting signals from and to the outside.

In addition to the above described sensors, the input port of the electronic control device 50 is connected to an NE sensor 51 for detecting the rotational speed of the engine 10, an acceleration pedal sensor 52 for detecting the degree of depression of an acceleration pedal, and a throttle valve sensor 53 for detecting the opening degree of the intake throttle valve 19. The output port of the electronic control device 50 is connected to a drive circuit for driving the intake throttle valve 19, the EGR valve 36, the injector 40, the fuel pump 43, and the fuel adding valve 46.

Based on detected signals from the above described sensors, the electronic control device 50 grasps the operating condition of the engine 10. According to the grasped operating condition, the electronic control device 50 outputs command signals to the drive circuits of the devices connected to the output port. The electronic control device 50 executes various control procedures such as control of the opening degree of the intake throttle valve 19, EGR control based on the opening degree control of the EGR valve 36, control of the amount, the timing and the pressure of fuel injection from the injector 40, and control related to fuel addition by the fuel adding valve 46.

In this embodiment, to prevent the NOx catalytic converter 25 and the PM filter 26 from being clogged with PM, a PM elimination control is performed, in which PM trapped by the NOx catalytic converter 25 and the PM filter 26 are burned to purify exhaust gas. In the PM elimination control, unburned fuel component is supplied to the NOx catalytic converter 25 and the NOx catalyst of the PM filter 26 so that the unburned fuel component is oxidized in exhaust gas or on each catalyst to generate heat. Accordingly, the catalyst is heated to a temperature of about 600 to 7000° C., and PM at the catalyst is burned.

During the PM elimination control, unburned fuel component may be supplied to the catalysts by sub-injection (after injection) in an exhaust stroke or an expansion stroke, which injection is executed after fuel is injected from the injector 40 to be combusted in the combustion chambers 13. Alternatively, unburned fuel may be supplied by adding fuel to exhaust gas from the fuel adding valve 46. To minimize extra fuel consumption due to the PM elimination control, the amount of unburned fuel component added to the catalysts in the PM elimination control is limited to the minimum value that allows for a necessary increase in the temperature of the catalysts.

In this embodiment, the PM elimination control is performed when the following requirements are all satisfied.

The elimination of PM is requested. A request for the PM elimination is made when clogging of the PM filter 26 is recognized based on the fact that the PM accumulation amount of the PM filter 26 estimated from the engine operating condition reaches and exceeds the highest value of a permissible range.

A detected value of the input gas temperature sensor 28 (input gas temperature thci) is more than or equal to a lower limit temperature A (for example, 150° C.) for performing the PM elimination control. Also, the catalyst bed temperature of the NOx catalyst, which is estimated from the history of the engine operating condition is more than or equal to a lower limit temperature B for performing the PM elimination control. The lower limit temperatures A, B are the lowest values of the exhaust temperature and the catalyst bed temperature that cause oxidation sufficient to increase the catalyst bed temperature as unburned fuel component is supplied.

The detected value of the input gas temperature sensor 28 is less than an upper limit value C in a temperature range for avoiding excessive temperature increase of the catalysts due to heat generated by the PM elimination control.

The detected value of the output gas temperature sensor 29 is less than an upper limit value D in a temperature range for avoiding excessive temperature increase of the catalysts due to the PM elimination control.

Fuel addition to exhaust gas is permitted. That is, the engine operating condition is in a range to permit the fuel addition to exhaust gas. The addition of fuel to exhaust gas is permitted in the internal combustion engine 10 as long as the engine 10 is not stalling, the cylinders have been distinguished, and the depression degree of the acceleration pedal is not limited.

At the upstream end of the NOx catalytic converter 25 and the upstream end of the PM filter 26, some PM remains even if the above described PM elimination control is performed. The reason why PM remains is believed to be that PM is likely to be deposited at the exhaust upstream end of the NOx catalytic converter 25 and the exhaust upstream end of the PM filter 26, and the supply of unburned fuel component in the PM elimination control cannot supply a sufficient amount of unburned fuel component per unit time to burn the PM completely. Particularly, in the NOx catalytic converter 25, which is located upstream of the PM filter 26, a greater amount of PM that is not burned in the PM elimination control remains at the upstream end.

Figure 2A:
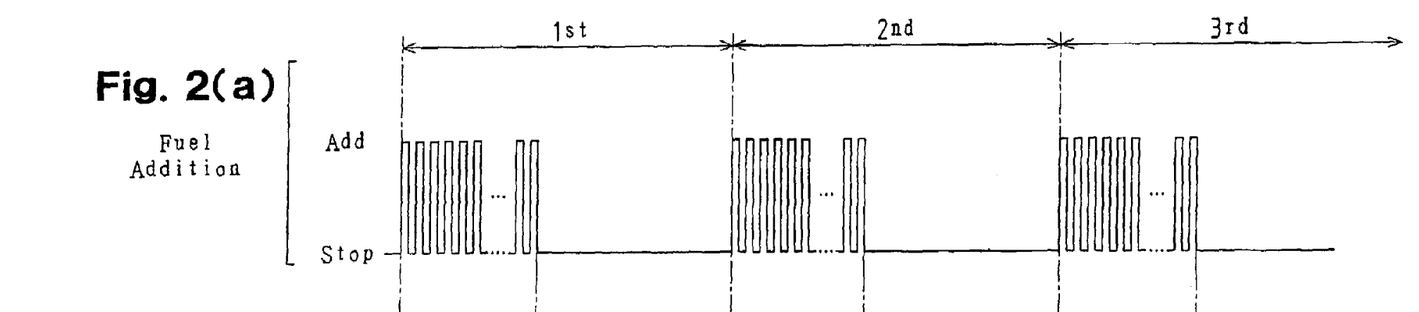
FIGS. 2(a) and 2(b) are time charts illustrating the manner of adding fuel and changes in the exhaust air-fuel ratio due to the fuel addition during burn-up control.
Figure 2B:
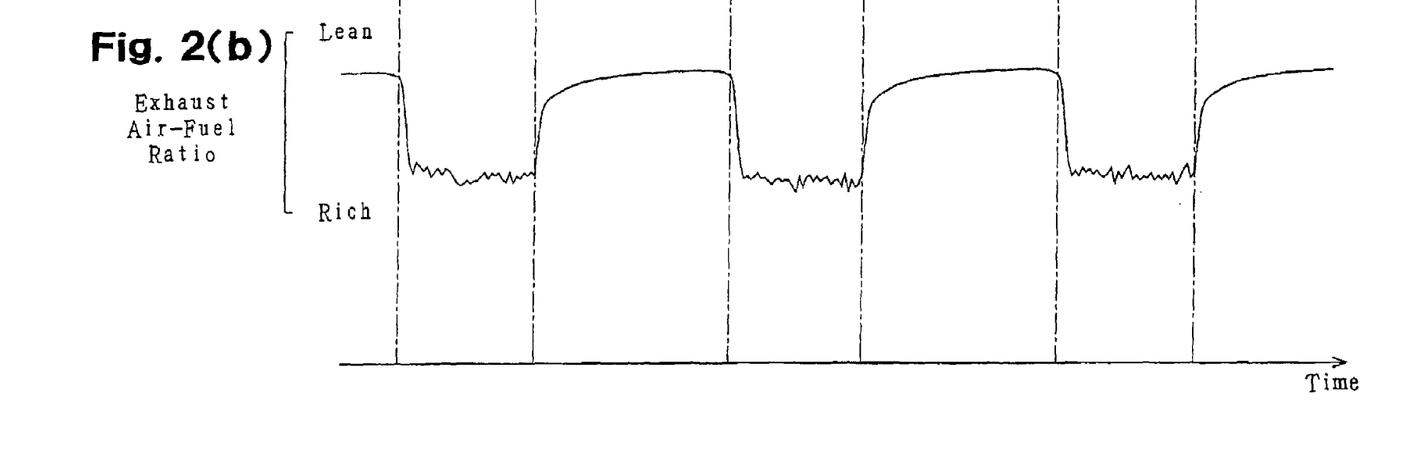

In this respect, a burn-up control is performed at the final stage of the PM elimination control to burn the PM that cannot be burned in the PM elimination control. The overview of the burn-up control will be described with reference to FIGS. 2(*a*) and 2(*b*). FIG. 2(*a*) shows the manner in which the fuel adding valve 46 adds fuel, and FIG. 2(*b*) shows changes in the exhaust air-fuel ratio.

As shown in FIG. 2(*a*), concentrated intermittent fuel addition is repeatedly performed and stopped in the burn-up control. The concentrated intermittent fuel addition increases the amount of unburned fuel component and oxygen supplied to the catalysts of the NOx catalytic converter 25 and the PM filter 26 to a level sufficient for burning the PM that cannot be burned in the PM elimination control. Therefore, the concentrated intermittent fuel addition permits the PM to be burned.

However, the concentrated intermittent fuel addition causes the catalyst bed temperature to increase noticeably. Thus, in this embodiment, the fuel addition is periodically stopped, thereby suppressing excessive increase in the catalyst bed temperature. As a result, intermittent concentrated fuel addition is repeatedly performed and stopped, and the exhaust air-fuel ratio is repeatedly reversed between a rich state and a lean state as shown in FIG. 2(*b*). The burn-up control is ended when the repetitions of performing and stopping of the concentrated intermittent fuel addition has reached a number (in this embodiment, three times) that is sufficient for burning the PM remaining in the NOx catalytic converter 25 and the PM filter 26.

The PM elimination control is stopped based on the end of the burn-up control.

Figure 3:
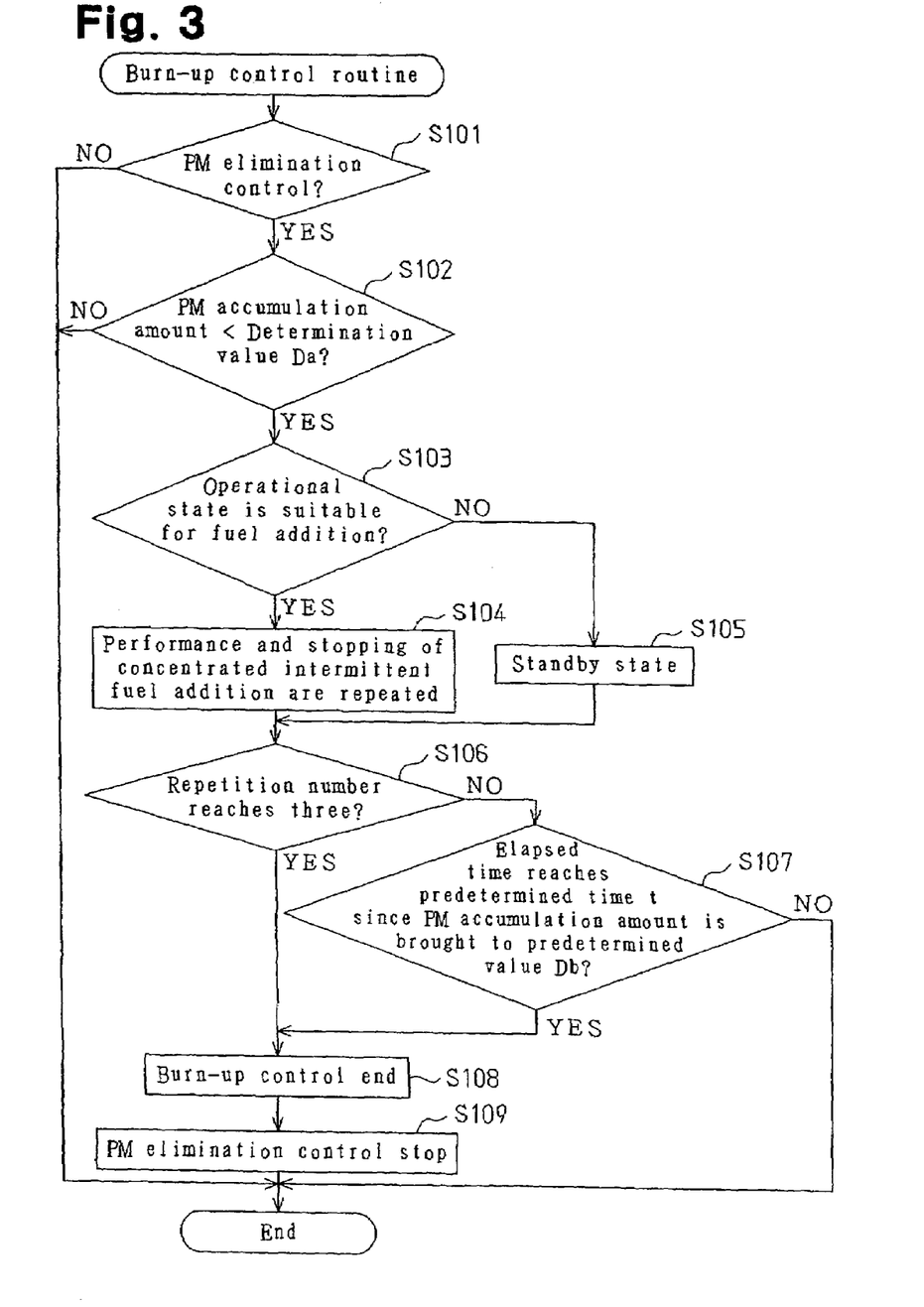
FIG. 3 is a flowchart showing execution of a procedure for the burn-up control at the final stage for PM elimination control.

The procedure for the burn-up control at the final stage of the PM elimination control will now be described with reference to FIG. 3, which shows a routine of the burn-up control. The burn-up control routine is executed as an interrupt by the electronic control device 50, for example, at predetermined time intervals.

In the routine, whether the PM elimination control is currently performed is determined (S101). If the PM elimination control is being performed, whether a PM accumulation amount has fallen below a determination value Da is determined (S102). If the outcome of S102 is positive, steps S103 to S105 for performing the burn-up control are performed.

The determination value Da is set to a value that indicates that in each of the NOx catalytic converter 25 and the PM filter 26, PM in a section at a downstream side has been completely burned by the PM elimination control and PM in a section at an upstream side has not been completely burned by the PM elimination control. For example, the determination value Da is set to 0.3 g. If the burn-up control is executed with PM remaining in the downstream sections of the NOx catalytic converter 25 and the PM filter 26, and the PM is burned by the burn-up control, the temperature of these sections can be excessively increased. The value of the determination value Da is set to prevent such an excessive increase of the sections.

The concentrated intermittent fuel addition in the burn-up control serves no purpose unless it is performed in a state where the added fuel is vaporized and promotes burning of the PM. Therefore, in an operating condition where fuel added by the concentrated intermittent fuel addition is not vaporized, for example, in a low load operating condition where the exhaust temperature is not increased, the concentrated intermittent fuel addition is preferably suspended.

Thus, in steps S103 to S105 for performing the burn-up control, whether the current operational state is suitable for performing the concentrated intermittent fuel addition is determined based on, for example, the engine load and the engine rotational speed (S103). The performance and stopping of the concentrated intermittent fuel addition are repeated (S104) only when the outcome of S103 is positive. If the outcome of step S103 is negative, the burn-up control enters a standby state (S105), and the concentrated intermittent fuel addition is not performed. However, even in the standby state of the burn-up control, unburned fuel component continues being supplied to the catalysts based on the PM elimination control.

Step S106 and the following steps are for ending the burn-up control, and stopping the PM elimination control based on the end of the burn-up control. In this series of steps, when the number of repetitions of performance and stopping of the concentrated intermittent fuel addition reaches three (positive outcome at S106), the burn-up control is ended (S108). Accordingly, the PM elimination control is stopped (S109). However, if the burn-up control enters the standby state before the number of repletion reaches three and the standby state lasts for an extended period, it is unavoidable that the fuel consumption of the engine 10 deteriorates by the amount of unburned fuel component supplied to the catalysts in the PM elimination control.

Therefore, in this embodiment, even if the number of repetitions has not reached three (negative outcome at S106), the burn-up control is ended (S108) when the elapsed time reaches a predetermined time t since the PM accumulation amount is brought to a determination value Db, which is less than the determination value Da, by the burn-up control. Whether the elapsed time has reached the predetermined time t is determined based on, for example, a counter C. When the PM accumulation amount is brought to the determination value Db, the counter C starts being incremented from zero every predetermined period according to another routine. Based on the fact the counter C reaches a determination value Dc that corresponds to the predetermined time t, the elapsed time is determined to have reached the predetermined time t. Then, based on the end of the burn-up control (S108), the PM elimination control is stopped (S109). Thus, deterioration of the engine fuel economy due to a prolonged standby state of the burn-up control is prevented.

In this embodiment, the determination value Db is zero. The predetermined time t is set longer than a time required for consecutively repeating the performance and stopping of the concentrated intermittent fuel addition of the burn-up control three times, and is sufficiently short for preventing the deterioration of the fuel economy due to the performance of the PM elimination control in the standby state from exceeding a permissible level. Since it normally takes thirty to forty seconds to perform a single cycle of performing and stopping of the concentrated intermittent fuel addition, the predetermined time t may be set to, for example, 180 seconds.

Finally, the performance of the PM elimination control and the burn-up control will be described with reference to the time charts of FIGS. 4(a) to 4(d). FIGS. 4(a) to 4(d) are time charts showing changes in the PM accumulation amount, the state of the PM elimination control, the state of the burn-up control, and changes in the counter C, respectively.

At time T1, the PM elimination control is started. Then, the PM accumulation amount is reduced and has fallen below the determination value Da at time T2, where the burn-up control is started. During the burn-up control, if the standby state of the burn-up control lasts for an extended period, the end of the control will be delayed as indicated by a two-dot chain line in FIG. 4(c). Accordingly, the end of the PM elimination control based on the flow rate of the burn-up control will be delayed as indicated by a two-dot chain line in FIG. 4(b). As a result, the fuel economy will deteriorate by the amount of unburned fuel component supplied to the catalysts based on the PM elimination control in the standby state.

Figures 4A, 4B, 4C, 4D:
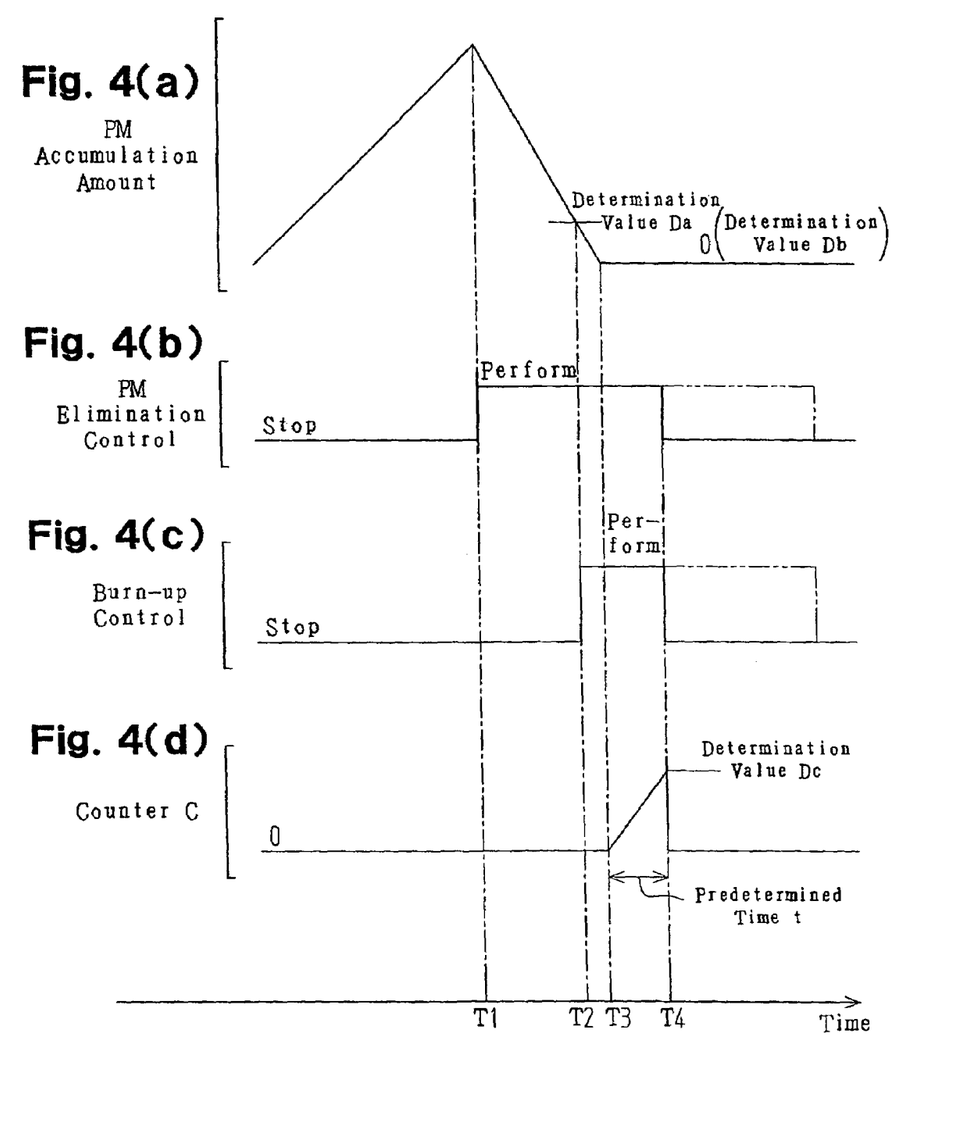
FIGS. 4(a) to 4(d) are time charts showing changes in the PM accumulation amount related to the PM elimination control and the burn-up control, the state of the PM elimination control, the state of the burn-up control, and changes in a counter C.

However, in this embodiment, when the elapsed time reaches the predetermined time t since when the PM accumulation amount has been brought to zero (the determination value Db) by the burn-up control, that is, when the counter C reaches the determination value Dc (time T4), the burn-up control is forcibly ended as indicated by a solid line in FIG. 4(c). In accordance with the forced end of the burn-up control, the PM elimination control is stopped as indicated by the solid line in FIG. 4(b). This suppresses the deterioration of the engine fuel economy.

The above described embodiment has the following advantages.

(1) PM in upstream sections of the NOx catalytic converter 25 and the PM filter 26, which cannot be completely burned by the PM elimination control, is completely burned by the burn-up control, which is performed at the final stage of the PM elimination control. Therefore, when the exhaust air-fuel ratio is richened after the end of the PM elimination control, no PM remaining in the upstream ends of the NOx catalytic converter 25 and the PM filter 26 is burned so that the temperature of the catalysts is prevented from excessively increasing.

(2) When the standby state of the burn-up control continues for an extended period, the burn-up control is forcibly stopped on the condition that the time elapsed since the PM accumulation amount is brought to the determination value Db (0) by the burn-up control reaches the predetermined time t. Therefore, even if the standby state of the burn-up control lasts for an extended period, the fuel economy of the engine will not deteriorate.

(3) The predetermined time t is set longer than the time required for consecutively repeating the performance and stopping of the concentrated intermittent fuel addition of the burn-up control three times, and is sufficiently short for preventing the deterioration of the fuel economy due to the performance of the PM elimination control in the standby state from exceeding a permissible level. Therefore, if the standby state of the burn-up control is expected to be so extended that deterioration of the fuel economy becomes impermissible, the burn-up control is forcibly ended. Accordingly, the fuel economy deterioration is suppressed to a permissible level.

(4) Since the NOx catalytic converter 25 is located upstream of the PM filter 26 in the exhaust passage 14, PM is likely to accumulate at the upstream end of the NOx catalytic converter 25. Accordingly, the amount of PM that cannot be completely burned by the PM elimination control is increased. In the sections where PM is not completely burned, the surface area of the catalysts exposed to exhaust gas is reduced. This delays the activation of the catalysts. Accordingly, the heat generated during the exhaust purification in the catalysts is reduced. As a result, the heat that is transferred from the NOx catalytic converter 25 to the PM filter 26 located downstream is reduced. This hampers the activation of the catalyst in the PM filter 26. As a result, the exhaust purification performance can be degraded. However, these drawbacks are eliminated by completely burning PM remaining at the upstream end of the NOx catalytic converter 25 by the burn-up control at the final stage of the PM elimination control.

The above described embodiments may be modified as follows.

The order of the NOx catalytic converter 25, the PM filter 26, and the oxidation catalytic converter 27 along the exhaust passage 14 may be changed as necessary.

In the burn-up control, the number of repetitions of performing and stopping of the concentrated intermittent fuel addition is not limited to three as long as the number is sufficient for completely burning remaining PM in the NOx catalytic converter 25 and the PM filter 26.

The determination value Da is not limited to 0.3 g, which is presented in the embodiment described above, as long as the value Da indicates that PM at the downstream sections of the NOx catalytic converter 25 and the PM filter 26 has been completely burned.

The determination value Db does not need to be zero, but may be changed to any value that is less than the determination value Da.

The present examples and embodiments are to be considered as illustrative and not restrictive and the invention is not to be limited to the details given herein, but may be modified within the scope and equivalence of the appended claims.

The invention claimed is:

1. An exhaust purifying apparatus for an internal combustion engine, the apparatus performing PM elimination control in which an unburned fuel component is supplied to a catalyst located in an exhaust system of the internal combustion engine so that the temperature of the catalyst is increased and particulate matter trapped at the catalyst is burned, the apparatus comprising:

execution unit, wherein, when an accumulation amount of particulate matter at the catalyst becomes less than a first determination value after the PM elimination control is started, the execution unit executes burn-up control in which performance and stopping of concentrated intermittent fuel addition to a section of the exhaust system that is upstream of the catalyst are repeated a predetermined number of times;

stopping unit that stops the PM elimination control based on an end of the burn-up control; and forcibly ending unit that forcibly ends the burn-up control when, after the burn-up control is started, time elapsed since the accumulation amount of particulate matter at the catalyst has dropped to a second determination value reaches a predetermined time, the second determination value being less than the first determination value, wherein the predetermined time is longer than a time required for consecutively repeating the performance and stopping of the concentrated intermittent fuel addition of the burn-up control the predetermined number of times, and is sufficiently short for preventing deterioration of fuel economy due to the performance of the PM elimination control in the predetermined time.

2. The apparatus according to claim 1, wherein the catalyst is supported by a PM filter and a NOx catalytic converter, which are placed in series in the exhaust system.

3. An exhaust purifying method for an internal combustion engine, the method comprising:

performing PM elimination control in which an unburned fuel component is supplied to a catalyst located in an exhaust system of the internal combustion engine so that the temperature of the catalyst is increased and particulate matter trapped at the catalyst is burned;

executing burn-up control when an accumulation amount of particulate matter at the catalyst becomes less than a first determination value after the PM elimination control is started, wherein, in the burn-up control, performance and stopping of concentrated intermittent fuel addition to a section of the exhaust system that is upstream of the catalyst are repeated a predetermined number of times;

stopping the PM elimination control on the condition that the burn-up control is ended; and forcibly ending the burn-up control when, after the burn-up control is started, time elapsed since the accumulation amount of particulate matter at the catalyst has been reduced to a second determination value reaches a predetermined time, the second determination value being less than the first determination value, wherein the predetermined time is longer than a time required for consecutively repeating the performance and stopping of the concentrated intermittent fuel addition of the burn-up control the predetermined number of times, and is sufficiently short for preventing deterioration of fuel economy due to the performance of the PM elimination control in the predetermined time.

4. The apparatus according to claim 3, wherein the catalyst is supported by a PM filter and a NOx catalytic converter, which are placed in series in the exhaust system.

5. The apparatus according to claim 1, wherein the burn-up control is performed at the final stage of the PM elimination control.

6. The method according to claim 3, wherein the burn-up control is performed at the final stage of the PM elimination control.

* * * * *

UNITED STATES PATENT AND TRADEMARK OFFICE
CERTIFICATE OF CORRECTION

PATENT NO. : 7,340,884 B2
APPLICATION NO. : 10/554992
DATED : March 11, 2008
INVENTOR(S) : Shigehiro Matsuno et al.

It is certified that error appears in the above-identified patent and that said Letters Patent is hereby corrected as shown below:

| Column | Line | |
|---|---|---|
| 10 | 44 | Change "according to claim 3," to --according to claim 1,--. |

Signed and Sealed this

Eleventh Day of August, 2009

David J. Kappos
*Director of the United States Patent and Trademark Office*